United States Patent (10) Patent No.: US 12,401,036 B2
Génin et al. (45) Date of Patent: Aug. 26, 2025

(54) DOUBLE LAYERED HYDROXIDE (DLH)-TYPE COMPOUND AND USE THEREOF IN AN ELECTRODE FOR AN ENERGY STORAGE DEVICE WITH ITS GRAPHITE AND RESIN COMPOSITE AND ELECTROLYTE

(71) Applicants: François Génin, Coral Gables, FL (US); Jean-Marie Génin, Neuviller-sur-Mosselle (FR)

(72) Inventors: François Génin, Coral Gables, FL (US); Jean-Marie Génin, Neuviller-sur-Moselle (FR)

(73) Assignee: François Genin, Berkeley, CA (US)

(*) Notice: Subject to any disclaimer, the term of this patent is extended or adjusted under 35 U.S.C. 154(b) by 719 days.

(21) Appl. No.: 17/259,882

(22) PCT Filed: Jul. 11, 2019

(86) PCT No.: PCT/US2019/041353
§ 371 (c)(1),
(2) Date: Jan. 12, 2021

(87) PCT Pub. No.: WO2020/014446
PCT Pub. Date: Jan. 16, 2020

(65) Prior Publication Data
US 2021/0344011 A1 Nov. 4, 2021

Related U.S. Application Data

(60) Provisional application No. 62/697,478, filed on Jul. 13, 2018.

(51) Int. Cl.
*H01M 4/58* (2010.01)
*C01G 49/00* (2006.01)
(Continued)

(52) U.S. Cl.
CPC ........ *H01M 4/5825* (2013.01); *C01G 49/009* (2013.01); *C01G 53/06* (2013.01);
(Continued)

(58) Field of Classification Search
CPC ...... H01M 4/58; H01M 4/5825; H01M 4/622; H01M 4/625
See application file for complete search history.

(56) References Cited

U.S. PATENT DOCUMENTS 4,967,018 A * 10/1990 Soo .......................... B01J 27/00
568/811
2010/0029822 A1 2/2010 Reedijk et al.
(Continued)

OTHER PUBLICATIONS

Mills et al., "Nomenclature of the hydrotalcite supergroup: natural layered double hydroxides," Mineralogical Magazine, vol. 76, Issue 5, pp. 1289-1336, (Oct. 1, 2012).

*Primary Examiner* — Kenneth J Douyette
(74) *Attorney, Agent, or Firm* — Maschoff Brennan

(57) ABSTRACT

The present disclosure relates to double layered hydroxide-type compounds comprising both di- and tri-valent nickel ions, and the use of such compounds in electrodes for energy storage device in addition to a previously developed electrode using $Fe^{2+}$ and $Fe^{3+}$ "green rusts related compounds".

22 Claims, 2 Drawing Sheets ideal model     actual structure
Crystal structure of LiFePO₄

Crystal structure of (a) Li Feᴵᴵ PO₄, (b) Feᴵᴵᴵ PO₄

(51) Int. Cl.
    *C01G 53/06*     (2006.01)
    *H01M 4/62*     (2006.01)
    *H01M 10/30*     (2006.01)

(52) U.S. Cl.
    CPC ........... *H01M 4/622* (2013.01); *H01M 4/625* (2013.01); *H01M 10/30* (2013.01); *C01P 2002/22* (2013.01); *C01P 2002/60* (2013.01); *C01P 2002/77* (2013.01); *C01P 2006/40* (2013.01); *H01M 2300/0014* (2013.01)

(56) References Cited

U.S. PATENT DOCUMENTS

2011/0183201 A1    7/2011  Genin et al.
2011/0212382 A1*  9/2011  Randall ................ C01G 49/009
                                                    264/618

* cited by examiner

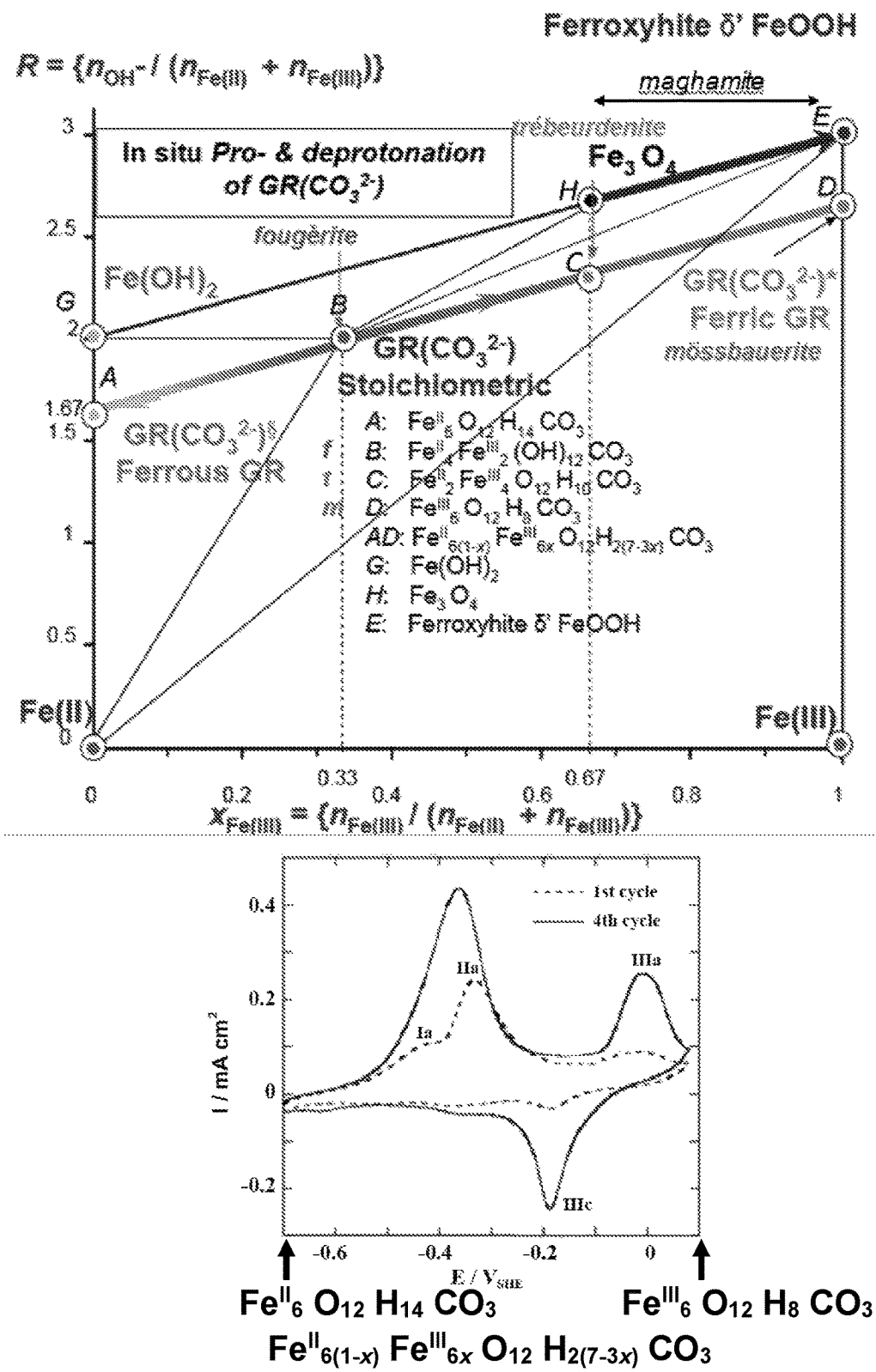
Figure 1. Mass balance diagram of $Fe^{II}_{6(1-x)} Fe^{III}_{6x} O_{12} H_{2(7-3x)} CO_3$ and corresponding voltammetric cycle of the material where $x$, the ferric molar ratio, may vary from 0 to 1.

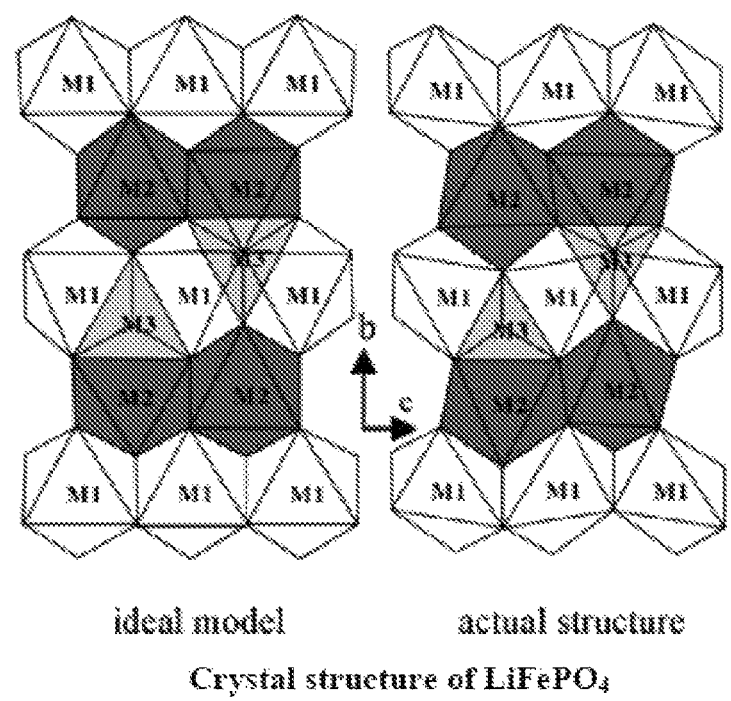
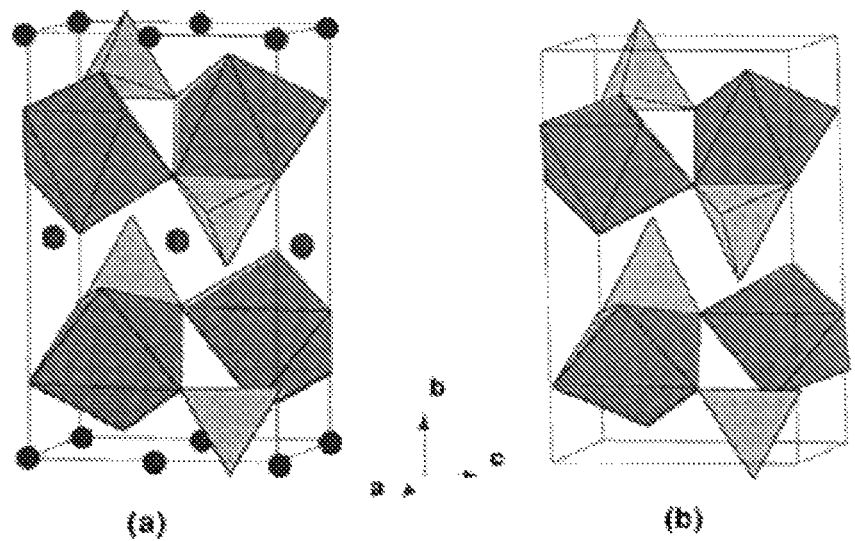
Figure 2. Crystal structure of (a) Li Fe$^{II}$ PO$_4$, (b) Fe$^{III}$ PO$_4$

DOUBLE LAYERED HYDROXIDE (DLH)-TYPE COMPOUND AND USE THEREOF IN AN ELECTRODE FOR AN ENERGY STORAGE DEVICE WITH ITS GRAPHITE AND RESIN COMPOSITE AND ELECTROLYTE

CROSS-REFERENCE TO RELATED APPLICATIONS

This application claims priority to and the benefit of U.S. Provisional Patent Application Ser. No. 62/697,478 entitled, "Double Layered Hydroxide (DLH)-type Compound and Use Thereof in an Electrode for an Energy Storage Device with its Graphite and Resin Composite and Electrolyte," filed Jul. 13, 2018, the disclosure of which is incorporated herein by reference in its entirety.

TECHNICAL FIELD

The present disclosure relates to double layered hydroxide (DLH)-type compounds comprising both di- and tri-valent nickel ions, and the use of such compounds in electrodes for energy storage devices.

BACKGROUND

Energy storage devices (such as secondary/rechargeable cells, rechargeable batteries and accumulators) generally comprise a positive electrode, a negative electrode, and an electrolyte. The positive electrode is, by convention, the cathode on discharge, and the negative electrode is the anode on discharge. As used herein, the term "cathode" refers to the positive electrode in the discharge cycle, and the term "anode" refers to the negative electrode in the discharge cycle.

SUMMARY

In one aspect, there is provided a compound having the formula $[Ni^{II}_{8(1-x)}Ni^{III}_{8x}O_{16}H_{2(9-4x)}]^{2+}[A^{2-}nH_2O]$, wherein x is from 0 to 1, and $A^{2-}$ is an anion of charge −2; wherein the compound has a double layered hydroxide (DLH)-type structure.

In some embodiments, $A^{2-}$ is $CO_3^{2-}$.

Water molecules incorporated in the double-layered hydroxide material do not play any role in the redox process. Water molecules may occupy sites within the interlayers that are left by two $CO_3^{2-}$ ions. In the case of the DLH material, i.e. $[Ni^{II}_{8(1-x)}Ni^{III}_{8x}O_{16}H_{2(9-4x)}]^{2+}[CO_3^{2-}nH_2O]^{2-}$ the lattice parameter unit cell is (4×a), if a is the distance between cations in the hexagonal pavement. Therefore, there are in a unit cell 16 possible sites and water molecules can fill at most 10 of these sites since each $CO_3^{2-}$ ion occupies three sites (one in nabla and the other one in delta configuration); they are probably less numerous than 10 (n≤10) and thus are distributed at random. In the case of the $Fe^{II}$-$Fe^{III}$ DLH material $Fe^{II}_{6(1-y)}Fe^{III}_{6y}O_{12}H_{2(7-3y)}]^{2+}[CO_3^{2-}mH_2O]^{2-}$, the unit cell is (2√3×a) corresponding to 12 sites, and water molecules can fill at most 6 of these sites (m≤6). However, all water molecules present in these materials do not play any role in the deprotonation-protonation process (described below), and the number of water molecules present is therefore not relevant to the functioning of the materials in their use as electrodes. Thus, from now on, they will not be mentioned any longer in all formulae, which can be written $Ni^{II}_{8(1-x)}Ni^{III}_{8x}O_{16}H_{2(9-4x)}CO_3$, on the one hand, and $Fe^{II}_{6(1-y)}Fe^{III}_{6y}O_{12}H_{2(7-3y)}CO_3$, on the other hand.

In some embodiments, the compound is in the form of flat hexagonal crystals (platelets) having a size of from 50 nm to 1500 nm. Often in some embodiments, the crystals have a crystal size of about 100 nm.

In some embodiments, the compound is for use in an electrode of an energy storage device.

In another aspect, there is provided a material for an electrode of an energy storage device, the material comprising a compound as defined in any of the above embodiments.

In some embodiments, the material is a composite material which further comprises a binder.

In some embodiments, the material further comprises graphite.

In another aspect, there is provided an electrode for an energy storage device, comprising the material as defined in any of the above embodiments.

In some embodiments, the electrode is a cathode on discharge of the energy storage device.

In some embodiments, the electrode is an anode on discharge of the energy storage device.

In another aspect, there is provided an energy storage device comprising the electrode as defined in any of the above embodiments.

In some embodiments, the energy storage device further comprises a second electrode comprising a compound of formula $Fe^{II}_{6(1-y)}Fe^{III}_{6y}O_{12}H_{2(7-3y)}CO_3$, wherein y is from 0 to 1. In some embodiments, x is 1 and y is 0. In other embodiments, x is 0 and y is 1.

In some embodiments, the energy storage device further comprises an electrolyte which is a $CO_3^{2-}/HCO_3^-$ buffer. In some embodiments, the electrolyte has a pH of from about 8 to about 12. In some embodiments, the electrolyte has a pH of about 10.

In another aspect, there is provided a method of preparing the compound of formula $Ni^{II}_{8(1-x)}Ni^{III}_{8x}O_{16}H_{2(9-4x)}CO_3$, as defined in any of the above embodiments, the method comprising:
  coprecipitation of a $Ni^{II}$ salt and a $Ni^{III}$ salt under an oxygen-free atmosphere, wherein a ratio $x=\{[Ni^{3+}]/([Ni^{2+}]+[Ni^{3+}])\}$ is equal to ¼ to provide a compound of formula $Ni^{II}_6Ni^{III}_2(OH)_{16}CO_3$; and
  deprotonation of the compound of formula $Ni^{II}_6Ni^{III}_2(OH)_{16}CO_3$, by fast addition of hydrogen peroxide under an oxygen-free atmosphere, to obtain the compound $Ni^{III}_8O_{16}H_{10}CO_3$.

In another aspect, there is provided a method of preparing an energy storage device as defined in any of the above embodiments, comprising:
  preparing the compound of formula $Ni^{II}_{8(1-x)}Ni^{III}_{8x}O_{16}H_{2(9-4x)}CO_3$, as defined in any of the above embodiments, by the method defined above;
  combining the compound obtained in step (a) with graphite and a first resin binder to form a first composite material;
  preparing a first electrode from the first composite material, e.g. a flat sheet.
  providing a second electrode comprising a second composite material, wherein the second composite material comprises graphite, a second resin binder, and a compound of formula $Fe^{II}_{6(1-y)}Fe^{III}_{6y}O_{12}H_{2(7-3y)}CO_3$, wherein y is from 0 to 1;
  providing an electrolyte which is a $CO_3^{2-}/HCO_3^-$ buffer having a pH of from about 8 to about 12; and assembling the first electrode, second electrode and electrolyte to provide the energy storage device.

In some embodiments, x in $Ni^{II}_{8(1-x)}Ni^{III}_{8x}O_{16}H_{2(9-4x)}CO_3$, is 1, whereas y in $Fe^{II}_{6(1-y)}Fe^{III}_{6y}O_{12}H_{2(7-3y)}CO_3$ is 0.

In some embodiments, x in $Ni^{II}_{8(1-x)}Ni^{III}_{8x}O_{16}H_{2(9-4x)}CO_3$, is 0, whereas y in $Fe^{II}_{6(1-y)}Fe^{III}_{6y}O_{12}H_{2(7-3y)}CO_3$, is 1.

In some embodiments, the first binder is a resin.
In some embodiments, the second binder is a resin.
In some embodiments, the buffer has a pH of about 10.

BRIEF DESCRIPTION OF FIGURES

FIG. 1 shows a mass balance diagram of $Fe^{II}_{6(1-x)}Fe^{III}_{6x}O_{12}H_{2(7-3x)}CO_3$ and a corresponding voltammetric cycle of this material where x (the ferric molar ratio) may vary from 0 to 1. "Green Rust" as observed in the corrosion of steel is the DHL at x=⅓.

FIG. 2 is a representation of the crystal structures of $LiFePO_4$ and $FePO_4$.

DETAILED DESCRIPTION

Existing rechargeable lithium-ion batteries are widely used in a variety of devices and applications, but suffer from various drawbacks. For example, such batteries are not very "environmentally-friendly", and may require specific precautions to be taken upon recycling. This type of battery also requires a relatively long period of charging. Furthermore, there is a high cost associated with lithium, due to the rarity of the lithium mineral deposit from which it is obtained.

A first generation of lithium-ion battery commercialized in 1991 by Sony is based on the reversible exchange of lithium ion between a cathode (e.g. a lithium transition metal oxide, such as lithium cobalt dioxide or a lithium manganese oxide) and a graphite anode. The use of an aprotic electrolyte (i.e. an electrolyte which has no acidic hydrogen atoms), such as $LiPF_6$ salt dissolved in a mixture of ethylene carbonate and propylene or tetrahydrofuran is necessary to avoid degradation of the very reactive electrodes. The major advantage of such batteries is their relative charge-discharge velocity over limited amplitudes; thus, they are essentially used for electronic devices but also hybrid powered cars. Unfortunately, they do not withstand heavy discharge, as this results in their fast deterioration.

A second generation of lithium-ion batteries, known as lithium iron phosphate batteries, utilize a $LiFePO_4$ cathode and a graphite anode. They are widespread in robotics due to the advantages of them having an energy density slightly higher than that of $LiCoO_2$ batteries, but this stays three times less than that of classical lead batteries because of the density of lead compared to that of iron. They withstand many more charge cycles than other lithium ion batteries and hence have a long battery life; it is also not necessary to favor partial charges (i.e. to favor charging the battery to less than 100%, or to avoid complete discharge of the battery). They support high current intensities (amperes) that allows them to yield much power and to be recharged quickly. They pose less of a fire hazard than other lithium ion batteries and can be used up to a temperature of 70° C. Moreover, the yielded voltage stability is very high during substantially the whole discharge cycle. Finally, lithium iron phosphate batteries are less polluting because they last much longer and because exposure to lead can cause lead poisoning (also known as saturnism), and they can be stored for a longer period due to their slower decline in energy density. The main drawback of lithium iron phosphate batteries is that the discharge velocity strongly decreases at around 80% of discharge. Furthermore, there is a high cost associated with lithium, due to the rarity of the lithium mineral deposit from which it is obtained. Lithium is also dangerous for the health even in small quantities.

The crystal structure of the active mineral compound $LiFePO_4$ is identical to that of olivine, which is made of entangled octahedrons and tetrahedrons (see FIG. 2). The structure displays channels through which $Li^+$ ions can migrate, despite their significant size. Distortions due to strains that the material undergoes result in the channels not remaining perfectly straight; therefore, it becomes more and more difficult to introduce $Li^+$ ions during the discharge, which also limits the velocity of the charge-discharge cycles.

The active compound of lithium iron phosphate batteries can be written as $Fe^{II}_{(1-x)}Fe^{III}_xLi_{(1-x)}PO_4$. In its ferric state, when completely charged at x=1, it is $Fe^{III}PO_4$; whereas in its ferrous state at x=0 when completely discharged, it is $LiFe^{II}PO_4$.

The lithium extraction from $LiFe^{II}PO_4$ to charge the cathode can be written:

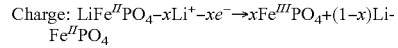

The lithium insertion into $Fe^{III}PO_4$ to discharge the cathode thus becomes:

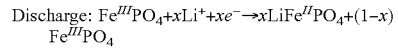

Examples of ferrous-ferric oxyhydroxysalts which are related to the family of layered double hydroxides are described in U.S. Pat. No. 9,051,190, the disclosure of which is incorporated by reference herein and attached hereto as Exhibit A). These double layered hydroxide compounds ("DLH") are made of layers comprising di- and trivalent cations that lie at the center of octahedra, the apices of which are occupied by hydroxyl ($OH^-$) ions. Between these layers (which are identical to those observed in $Fe^{II}(OH)_2$), interlayers comprising anions and water molecules are intercalated; this induces a mixture of di- and trivalent cations to balance the charges. Among all possible DLHs, the special case where the divalent and trivalent cations belong to the same element yield new most interesting properties from a technological point of view. In the case of iron, a ferrous-ferric compound family—called "green rusts" because they appear during the corrosion process of steels—is obtained. These "green rusts" may undergo rapid oxidation when exposed to hydrogen peroxide, $H_2O_2$; this oxidation proceeds in situ by deprotonation of $OH^-$ ions to obtain a completely ferric compound where the initial crystal structure is entirely conserved. Among all possible anions to be intercalated, carbonate ions $CO_3^{2-}$ have been chosen in view of their stability. The formula is $Fe^{III}_6O_{12}H_8CO_3$. Such an active compound is produced by coprecipitating two salts, one of which is ferrous and the other of which is ferric, according to the "classical" method for any "carbonated green rust" synthesis where the ferric molar ratio $x=\{[Fe^{3+}]/([Fe^{2+}]+[Fe^{3+}])\}$ is ⅓, corresponding to a formula $Fe^{II}_4Fe^{III}_2(OH)_{12}CO_3$. The coprecipitation is done in a glove box under a nitrogen atmosphere and the hydrogen peroxide is poured at once abundantly to obtain the ferric form $Fe^{III}_6O_{12}H_8CO_3$. Voltammetric cycles detect the protonation-deprotonation phenomenon of the compound leading to the general formula $Fe^{II}_{6(1-x)}Fe^{III}_{6x}O_{12}H_{2(7-3x)}CO_3$ where x is from 0 to 1. In its completely charged ferric state at x=1, the formula is $Fe^{III}_6O_{12}H_8CO_3$, whereas in its completely discharged ferrous state at x=0, it is $Fe^{II}_6O_{12}H_{14}CO_3$. An analogy can be drawn with the case of the cathode of LiFePO$_4$, with the proton H$^+$ taking the place of the lithium ion Li$^+$.

The deprotonation of OH$^-$ ions in Fe$^{II}_6$O$_{12}$H$_{14}$CO$_3$ to charge the electrode can be written:

Charge: Fe$^{II}_6$O$_{12}$H$_{14}$CO$_3$−6xH$^+$−6xe$^-$→ xFe$^{III}_6$O$_{12}$H$_8$CO$_3$+(1−x)Fe$^{II}_6$O$_{12}$H$_{14}$CO$_3$ The protonation of O$^{2-}$ or OH$^-$ ions in Fe$^{III}_6$O$_{12}$H$_8$CO$_3$ to discharge the electrode becomes:

Discharge: Fe$^{III}_6$O$_{12}$H$_8$CO$_3$+6xH$^+$+6xe$^-$→ xFe$^{II}_6$O$_{12}$H$_{14}$CO$_3$+(1−x)Fe$^{III}_6$O$_{12}$H$_8$CO$_3$ The active compound of a battery electrode is thus obtained. However, in contrast to the case of lithium iron phosphate batteries, it is not possible to use graphite (as an insertion compound) for the second electrode.

It would therefore be desirable, and is an object of the present disclosure, to provide a second electrode which can be used with an electrode comprising the Fe$^{II}_{6(1-x)}$Fe$^{III}_{6x}$O$_{12}$H$_{2(7-3x)}$CO$_3$ compound, above.

The present disclosure describes a new material having a double layered hydroxide-type structure, which can be used as the second electrode in energy storage devices which employ a double layered hydroxide-type compound of formula Fe$^{II}_{6(1-x)}$Fe$^{III}_{6x}$O$_{12}$H$_{2(7-3x)}$CO$_3$ in the first electrode thereof.

The material has the general formula [Ni$^{II}_{8(1-x)}$Ni$^{III}_{8x}$O$_{16}$H$_{2(9-4x)}$]$^{2+}$A$^{2-}$, wherein x is from 0 to 1, and A$^{2-}$ is an anion of charge −2. In particular, A$^{2-}$ may be CO$_3^{2-}$.

In particular, the material may have the formula [Ni$^{II}_{8(1-x)}$Ni$^{III}_{8x}$O$_{16}$H$_{2(9-4x)}$]$^{2+}$CO$_3^{2-}$ (also written as Ni$^{II}_{8(1-x)}$Ni$^{III}_{8x}$O$_{16}$H$_{2(9-4x)}$CO$_3$). In its completely oxidized state at x=1 (i.e. its completely charged state when it is the active material of a cathode in an energy storage device), the material has the formula Ni$^{III}_8$O$_{16}$H$_{10}$CO$_3$. In its completely reduced state at x=0 (i.e. its completely discharged state when it is the active material of a cathode in an energy storage device), the material has the formula Ni$^{II}_8$O$_{16}$H$_{18}$CO$_3$.

The deprotonation of OH$^-$ ions in Ni$^{II}_8$O$_{16}$H$_{18}$CO$_3$ to charge the electrode is written:

Charge: Ni$^{II}_8$O$_{16}$H$_{18}$CO$_3$−8xH$^+$−8xe$^-$→ xNi$^{III}_8$O$_{16}$H$_{10}$CO$_3$+(1−x)Ni$^{II}_8$O$_{16}$H$_{18}$CO$_3$ The protonation of O$^{2-}$ or OH$^-$ ions in Ni$^{III}_8$O$_{16}$H$_{10}$CO$_3$ to discharge the electrode is now written:

Discharge: Ni$^{III}_8$O$_{16}$H$_{10}$CO$_3$+8xH$^+$+8xe$^-$→ xNi$^{II}_8$O$_{16}$H$_{18}$CO$_3$+(1−x)Ni$^{III}_8$O$_{16}$H$_{10}$CO$_3$ In an energy storage device which comprises both a Ni$^{II}$-Ni$^{III}$ DLH-containing electrode and a Fe$^{II}$-Fe$^{III}$ DLH-containing electrode as described above, the trivalent molar ratio is x={[M$^{III}$]/([M$^{II}$]+[M$^{III}$])} (where M$^{II}$ and M$^{III}$ are a metal in the divalent and trivalent states, respectively) and, when one electrode has x=1, the other one has x=0 (and vice-versa).

Which electrode will be the cathode and which will be the anode in such energy storage device may be determined experimentally (and is likely to depend on the Fermi levels and Brillouin zones for the Ni$^{II}$-Ni$^{III}$ DLH and for the Fe$^{II}$-Fe$^{III}$ DLH).

If the cathode is the Ni$^{II}$-Ni$^{III}$ DLH-containing electrode, then the discharge of the cathode can be written:

Ni$^{III}_8$O$_{16}$H$_{10}$CO$_3$+8xH$^+$+8xe$^-$→xNi$^{II}_8$O$_{16}$H$_{18}$CO$_3$+(1−x)Ni$^{III}_8$O$_6$H$_{10}$CO$_3$ with the corresponding reaction at the anode being:

Fe$^{II}_6$O$_{12}$H$_{14}$CO$_3$−6xH$^+$−6xe$^-$→xFe$^{III}_6$O$_{12}$H$_8$CO$_3$+(1−x)Fe$^{II}_6$O$_{12}$H$_{14}$CO$_3$

Balancing the charges gives:

3Ni$^{III}_8$O$_{16}$H$_{10}$CO$_3$+ 4Fe$^{II}_6$O$_{12}$H$_{14}$CO$_3$→3xNi$^{II}_8$O$_{16}$H$_{18}$CO$_3$+3(1−x)Ni$^{III}_8$O$_6$H$_{10}$CO$_3$+4xFe$^{III}_6$O$_{12}$H$_8$CO$_3$+4(1−x)Fe$^{II}_6$O$_{12}$H$_{14}$CO$_3$

Thus, in the above case, the cathode is Ni$^{III}_8$O$_{16}$H$_{10}$CO$_3$ and the anode is Fe$^{II}_6$O$_{12}$H$_{14}$CO$_3$.

If, on the other hand, the cathode is the Fe$^{II}$-Fe$^{III}$ DLH-containing electrode, then the discharge of the cathode can be written:

Fe$^{III}_6$O$_{12}$H$_8$CO$_3$+6xH$^+$+6xe$^-$→xFe$^{II}_6$O$_{12}$H$_{14}$CO$_3$+(1−x)Fe$^{III}_6$O$_{12}$H$_8$CO$_3$ with the corresponding reaction at the anode being:

Ni$^{II}_8$O$_{16}$H$_{18}$CO$_3$−8xH$^+$−8xe$^-$→xNi$^{III}_8$O$_{16}$H$_{10}$CO$_3$+(1−x)Ni$^{II}_8$O$_{16}$H$_{18}$CO$_3$

Balancing the charges gives:

4Fe$^{III}_6$O$_{16}$H$_8$CO$_3$+ 3Ni$^{II}_8$O$_{16}$H$_{18}$CO$_3$→4xFe$^{II}_6$O$_{12}$H$_4$CO$_3$+4(1−x)Fe$^{III}_6$O$_{12}$H$_8$CO$_3$+3xNi$^{III}_8$O$_{16}$H$_{10}$CO$_3$+3(1−x)Ni$^{II}_8$O$_{16}$H$_{18}$CO$_3$

Thus, in this case, the cathode is Fe$^{III}_6$O$_{16}$H$_8$CO$_3$ and the anode is Ni$^{II}_8$O$_{16}$H$_{18}$CO$_3$.

In some embodiments, the electrolyte in the energy storage device can be a CO$_3^{2-}$/HCO$_3^-$ buffer having a basic pH, e.g. pH of from 8-12 or 9-11. In some embodiments, the buffer can have a pH of about 10. An appreciable advantage of using such an electrolyte is that previous studies of the E$_h$-pH diagram, carried out in order to understand the corrosion process of iron and steels, have shown that the "green rust" compound undergoing protonation-deprotonation is very stable at this basic pH, whereas it dissolves under pH 4. Preparation of the [Ni$^{II}_{8(1-x)}$Ni$^{III}_{8x}$O$_{16}$H$_{2(9-4x)}$]$^{2+}$CO$_3^{2-}$ active products by the co-precipitation reaction described above results a product having a crystal size of the order of a tenth of micrometer (for example, 50-150 nm, 75-125 nm, or about 100 nm). Therefore, these crystals must be electrically connected to one another with a conductive resin, forming a composite material. Graphite-containing resins (comprising a binder and graphite) are commonly used for all batteries on the market, including LiFePO$_4$ batteries, and may be used for the electrodes of the present application.

The Ni$^{II}_{8(1-x)}$Ni$^{III}_{8x}$O$_{16}$H$_{2(9-4x)}$CO$_3$ material described above can be obtained by synthesizing the appropriate double layered hydroxide and then immediately oxidizing it by in situ deprotonation with hydrogen peroxide. Carbonate anions CO$_3^{2-}$ are again chosen for intercalation, and the ratio x={[Ni$^{3+}$]/([Ni$^{2+}$]+[Ni$^{3+}$])} is equal to ¼. A mineral named takovite and having the formula Ni$^{II}_6$Al$^{III}_2$(OH)$_{16}$CO$_3$, 4H$_2$O exists in the natural environment, and is found in nickel deposits e.g. in New Caledonia. It has been found that this compound can be synthesized in the laboratory by coprecipitation of Ni$^{II}$ and Al$^{III}$ salts. The present inventors have found that an analogous coprecipitation of Ni$^{II}$ and Ni$^{III}$ salts under an oxygen-free atmosphere, e.g. a nitrogen atmosphere, results in the double layered hydroxide compound Ni$^{II}_6$Ni$^{III}_2$(OH)$_{16}$CO$_3$. Immediate oxidation of this synthetic compound using sufficient hydrogen peroxide, again under an oxygen-free atmosphere (e.g. nitrogen atmosphere), results in a new completely oxidized compound, Ni$^{III}_8$O$_{16}$H$_{10}$CO$_3$. This compound can then be exposed to air without any deterioration. This compound can be used as the second electrode of a Fe-Ni Proton battery i.e. a battery wherein the first electrode contains the $Fe^{II}_{6(1-x)}Fe^{III}_{6x}O_{12}H_{2(7-3x)}CO_3$ compound (x being from 0 to 1) as described above. The divalent state is automatically achieved when charging the electrode (see the voltammetric curve of FIG. 1).

The $Ni^{III}_8O_{16}H_{10}CO_3$ compound may be incorporated within a first graphite based conductive resin (such as that available from Merken, previously known as Carbone-Lorraine), and the $Fe^{II}_{6(1-x)}Fe^{III}_{6x}O_{12}H_{2(7-3x)}CO_3$ may be incorporated within a second graphite based conductive resin. This provides the compounds with the mechanical strength to constitute two electrodes (the shape, volume, depth and surface of which are suitable for use in energy storage devices for applications such as electronic devices, electric vehicles, etc.). These electrodes can then be utilized in an energy storage device, using an electrolyte which is a $CO_3^{2-}/HCO_3^-$ buffer having a basic pH, e.g. pH of from 8-12 or 9-11. In some embodiments, the buffer can have a pH of about 10.

Several pairs of such electrodes can be set in series (as in other batteries) in order to increase the power of the energy storage device.

Citation of publications and patent documents is not intended as an admission that any is pertinent prior art, nor does it constitute any admission as to the contents or date of the same. Those of skill in the art will recognize that the inventions described herein can be practiced in a variety of embodiments and that the foregoing description and examples below are for purposes of illustration and not limitation of the claims that follow.

All definitions, as defined and used herein, should be understood to control over dictionary definitions, definitions in documents incorporated by reference, and/or ordinary meanings of the defined terms.

The invention claimed is:

1. A compound having a formula:

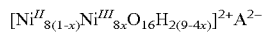

wherein x is from 0 to 1, and $A^{2-}$ is an anion of charge −2, wherein the compound has a double layered hydroxide-type structure.

2. The compound of claim 1, wherein $A^{2-}$ is $CO_3^{2-}$.

3. The compound of claim 1, wherein the compound is in the form of crystals having a crystal size of from 50 nm to 1500 nm.

4. A material for an electrode of an energy storage device, the material comprising a compound of claim 1.

5. The material of claim 4, wherein the material is a composite material which further comprises a binder.

6. The material of claim 5, wherein the material further comprises graphite.

7. An electrode for an energy storage device, comprising the material of claim 6.

8. The electrode of claim 7, wherein the electrode is a cathode on discharge of the energy storage device.

9. The electrode of claim 7, wherein the electrode is an anode on discharge of the energy storage device.

10. An energy storage device comprising the electrode of claim 7.

11. The energy storage device of claim 10, further comprising a second electrode comprising a compound of formula $Fe^{II}_{6(1-y)}Fe^{III}_{6y}O_{12}H_{2(7-3y)}CO_3$, wherein y is from 0 to 1.

12. The energy storage device of claim 11, wherein x is 1 and y is 0.

13. The energy storage device of claim 11, wherein x is 0 and y is 1.

14. The energy storage device of claim 10, further comprising an electrolyte which is a $CO_3^{2-}/HCO_3^-$ buffer.

15. The energy storage device of claim 14, wherein the electrolyte has a pH of from about 8 to about 12.

16. A method of preparing a compound of claim 1, the method comprising:
(a) coprecipitation of a $Ni^{II}$ salt and a $Ni^{III}$ salt under an oxygen-free atmosphere, wherein a ratio x={[Ni$^{3+}$]/([Ni$^{2+}$]+[Ni$^{3+}$])} is equal to ¼ to provide a compound of formula $Ni^{II}_6Ni^{III}_2(OH)_{16}CO_3$; and
(b) deprotonation of the compound of formula $Ni^{II}_6Ni^{III}_2(OH)_{16}CO_3$ by addition of hydrogen peroxide under an oxygen-free atmosphere, to obtain the compound $Ni^{III}_8O_{16}H_{10}CO_3$.

17. A method of preparing an energy storage device according to claim 12, comprising:
(a) preparing a compound having the formula:

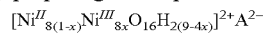

wherein x is from 0 to 1, and $A^{2-}$ is an anion of charge −2,
wherein the compound has a double layered hydroxide-type structure,
wherein the compound is prepared using a method including:
(i) coprecipitation of a $Ni^{II}$ salt and a $Ni^{III}$ salt under an oxygen-free atmosphere, wherein a ratio x={[Ni$^{3+}$]/([Ni$^{2+}$]+[Ni$^{3+}$])} is equal to ¼ to provide a compound of formula $Ni^{II}_6Ni^{III}_2(OH)_{16}CO_3$; and
(ii) deprotonation of the compound of formula $Ni^{II}_6Ni^{III}_2(OH)_{16}CO_3$ by addition of hydrogen peroxide under an oxygen-free atmosphere, to obtain the compound $Ni^{III}_8O_{16}H_{10}CO_3$,
(b) combining the compound obtained in step (a) with graphite and a first binder to form a first composite material;
(c) preparing a first electrode from the first composite material;
(d) providing a second electrode comprising a second composite material, wherein the second composite material comprises graphite, a second binder, and a compound of formula $Fe^{II}_{6(1-y)}Fe^{III}_{6y}O_{12}H_{2(7-3y)}CO_3$, wherein y is from 0 to 1;
(e) providing an electrolyte which is a $CO_3^{2-}/HCO_3^-$ buffer having a pH of from about 8 to about 12; and
(f) assembling the first electrode, second electrode and electrolyte to provide the energy storage device.

18. The method of claim 17, wherein x in $Ni^{II}_{8(1-x)}Ni^{III}_{8x}O_{16}H_{2(9-4x)}CO_3$ is 1, and y in $Fe^{II}_{6(1-y)}Fe^{III}_{6y}O_{12}H_{2(7-3y)}CO_3$ is 0.

19. The method of claim 17, wherein x in $Ni^{II}_{8(1-x)}Ni^{III}_{8x}O_{16}H_{2(9-4x)}CO_3$ is 0, and y in $Fe^{II}_{6(1-y)}Fe^{III}_{6y}O_{12}H_{2(7-3y)}CO_3$ is 1.

20. The method of claim 17, wherein the first electrode and the second electrode are initially in the trivalent state.

21. The method of claim 17, wherein the first binder and the second binder is a resin.

22. The method of claim 17, wherein the buffer has a pH of about 10.

* * * * *